United States Patent
Gokita

(10) Patent No.: US 11,243,877 B2
(45) Date of Patent: Feb. 8, 2022

(54) METHOD, APPARATUS FOR DATA MANAGEMENT, AND NON-TRANSITORY COMPUTER-READABLE STORAGE MEDIUM FOR STORING PROGRAM

(71) Applicant: FUJITSU LIMITED, Kawasaki (JP)

(72) Inventor: Shun Gokita, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 142 days.

(21) Appl. No.: 16/378,848

(22) Filed: Apr. 9, 2019

(65) Prior Publication Data

US 2019/0340120 A1 Nov. 7, 2019

(30) Foreign Application Priority Data

May 1, 2018 (JP) .............................. JP2018-088430

(51) Int. Cl.
*G06F 12/02* (2006.01)
*G06F 12/08* (2016.01)
(Continued)

(52) U.S. Cl.
CPC ...... *G06F 12/0246* (2013.01); *G06F 12/0802* (2013.01); *G06F 3/061* (2013.01);
(Continued)

(58) Field of Classification Search
CPC ............. G06F 12/0246; G06F 12/0802; G06F 2212/7205; G06F 2212/2022; G06F 3/061;
(Continued)

(56) References Cited

U.S. PATENT DOCUMENTS

| 2010/0030944 | A1* | 2/2010 | Hinz .................... G06F 12/0866 711/103 |
| 2011/0161563 | A1 | 6/2011 | Chang et al. |
| 2013/0086304 | A1* | 4/2013 | Ogawa .................... G06F 3/064 711/103 |
| 2013/0205111 | A1* | 8/2013 | Sakai .................... G06F 3/0608 711/170 |

(Continued)

FOREIGN PATENT DOCUMENTS

| JP | 2009-104430 | 5/2009 |
| JP | 2013-200839 | 10/2013 |

(Continued)

OTHER PUBLICATIONS

Japanese Office Action [JPOA] dated Dec. 7, 2021, for corresponding Japanese Patent Application No. 2018-088430 with Machine Translation.

*Primary Examiner* — Masud K Khan
(74) *Attorney, Agent, or Firm* — Fujitsu Patent Center

(57) ABSTRACT

A method for data management by a computer coupled to a solid state drive (SSD), the SSD being configured to include blocks and channels, each of the blocks being a first area as a unit of data deletion and being configured to include pages, each of the pages being a second area as a unit of data access in the SSD, each of the channels being a transmission and reception route of data to and from the block, the method includes: executing allocation processing for allocating, to a management target having a fixed length determined, a logical block including the blocks coupled to different channels, executing management processing for, when a size of a division management target is more than a size of the page, allocating the division management target to the pages coupled to the different channels included in the logical block allocated to the management target.

18 Claims, 12 Drawing Sheets

(51) Int. Cl.
*G06F 3/06* (2006.01)
*G06F 13/00* (2006.01)
*G06F 12/0802* (2016.01)

(52) U.S. Cl.
CPC .......... *G06F 3/0631* (2013.01); *G06F 3/0652* (2013.01); *G06F 3/0679* (2013.01); *G06F 13/00* (2013.01); *G06F 2212/2022* (2013.01); *G06F 2212/7202* (2013.01); *G06F 2212/7205* (2013.01); *G06F 2212/7208* (2013.01)

(58) Field of Classification Search
CPC .... G06F 3/0631; G06F 3/0652; G06F 3/0679; G06F 2212/7208; G06F 2212/7202; G06F 13/00
See application file for complete search history.

(56) References Cited

U.S. PATENT DOCUMENTS

| | | |
|---|---|---|
| 2013/0250686 A1 | 9/2013 | Marukame et al. |
| 2013/0275656 A1* | 10/2013 | Talagala ............... G06F 12/0246 711/103 |
| 2015/0161163 A1 | 6/2015 | Cypher et al. |
| 2016/0188461 A1 | 6/2016 | Takabatake |
| 2018/0059955 A1* | 3/2018 | Moon .................. G06F 3/0659 |
| 2018/0210828 A1* | 7/2018 | Zhou ..................... G06F 3/0652 |
| 2018/0267895 A1* | 9/2018 | Jung .................... G06F 3/0619 |
| 2019/0196748 A1* | 6/2019 | Badam .................. G06F 3/0688 |

FOREIGN PATENT DOCUMENTS

| | | |
|---|---|---|
| JP | 2015-144022 | 8/2015 |
| JP | 2016-541068 | 12/2016 |
| WO | 2010/151750 | 12/2010 |
| WO | 2015121938 A1 | 8/2015 |

* cited by examiner

FIG. 3

| SLAB ID | SLAB CLASS | LOGICAL BLOCK ID |
|---------|------------|------------------|
| 0 | 1 | 0 |
| 1 | 4 | 1 |

⋮

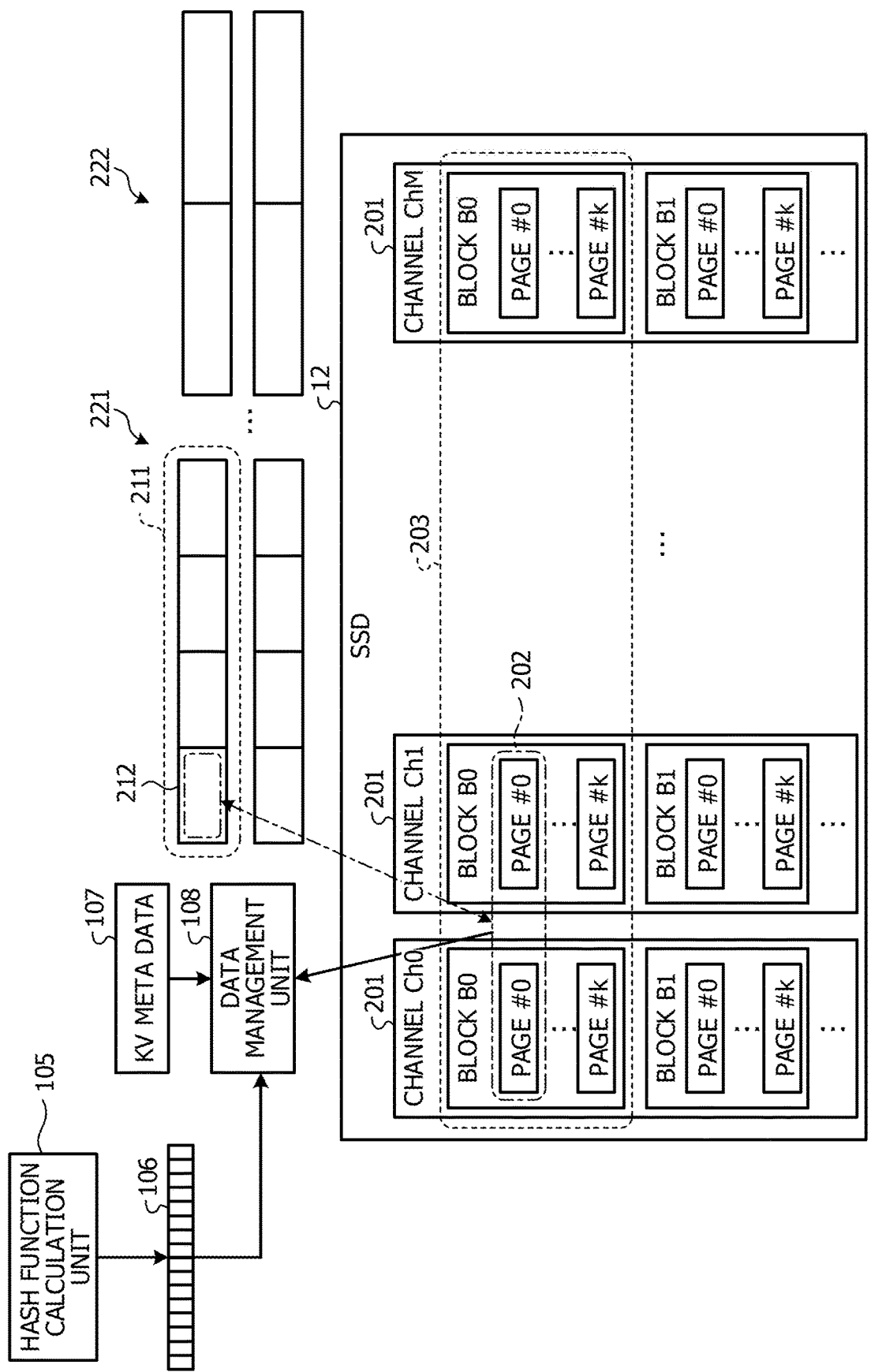

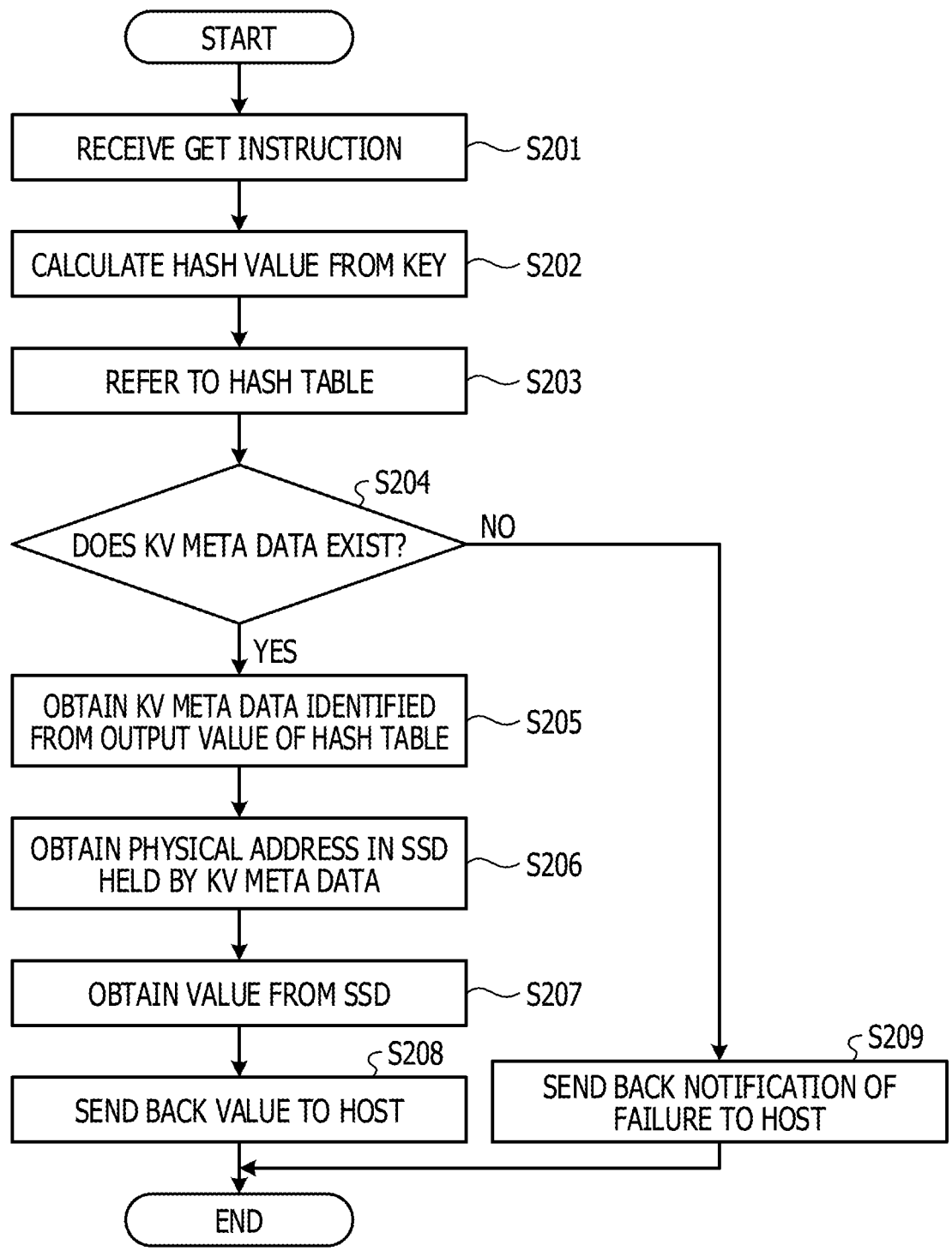

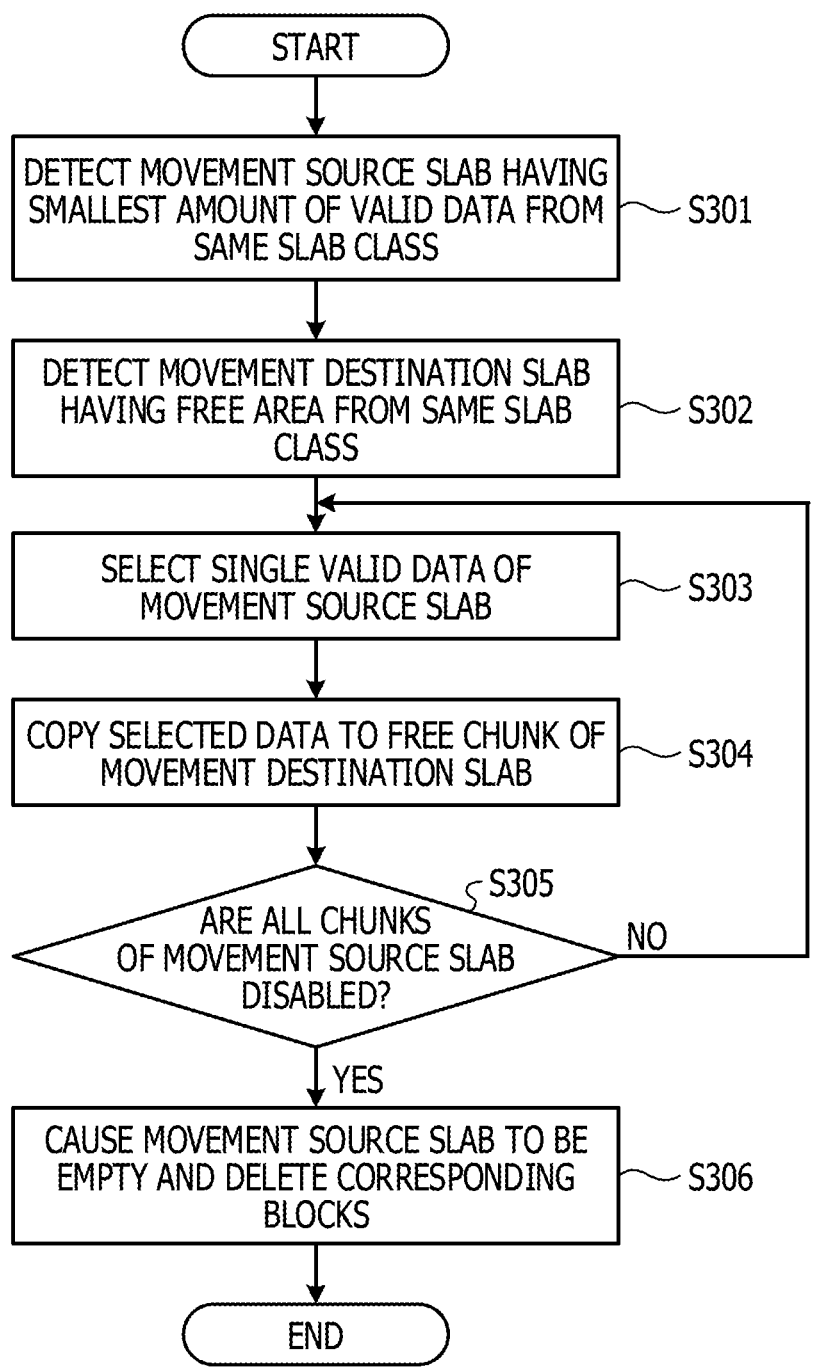

METHOD, APPARATUS FOR DATA MANAGEMENT, AND NON-TRANSITORY COMPUTER-READABLE STORAGE MEDIUM FOR STORING PROGRAM

CROSS-REFERENCE TO RELATED APPLICATION

This application is based upon and claims the benefit of priority of the prior Japanese Patent Application No. 2018-88430, filed on May 1, 2018, the entire contents of which are incorporated herein by reference.

FIELD

The embodiments discussed herein are related to a data management method, a data management apparatus, and a non-transitory computer-readable storage medium for storing a program.

BACKGROUND

In a large-scale system of social networking service (SNS) or the like, a large amount of accesses concentrates in a database. Therefore, in such a large-scale system, a cache server is installed in addition to the database to distribute the accesses.

The system using a cache server performs such operation as follows. For example, the system obtains an item directly from the cache server at the time of cache hit. On the other hand, the system obtains an item from the database and sets the item in the cache server at the time of cache miss.

For example, in recent years, an in-memory type cache server has been introduced as a cache server of higher speed. The in-memory type cache server has faster access speed to data than a disk-based database. Therefore, caching of an item of high access frequency to the in-memory type cache server enables the system to send back a response at high speed.

In addition, since a direct random access memory (DRAM) is expensive, a relatively-inexpensive solid state drive (SSD) is often used, and therefore, it is important to develop capacity expansion using an SSD in an in-memory type cache server.

There are various types of cache servers. For example, examples of a data holding format include a key value-type cache server having a data structure in which a key and a value are written as a set and a corresponding value is obtained by specifying a key. In addition, as a data management format, there is a cache server having a slab that is a fixed length storage area for data management and having a chunk that is generated by dividing the slab and is a unit for actually storing a key and a value. Here, such a cache server that manages data using a slab and a chunk is referred to as a slab chunk-type cache server. When the slab-chunk type cache server deals with chunks having different sizes, the cache server classifies slabs in accordance with the sizes of the chunks. In this case, each group of slabs is called a slab class. For example, chunks are determined by sectioning stepwise a size of several bytes to 1 megabyte and increasing the size in accordance with the order of steps, and a slab class is provided for each of the sizes of the chunks. The number of slabs included in each slab class is determined in accordance with an access frequency to the slab class.

Examples of an in-memory type cache server further include a cache server the capacity of which has been expanded by using a special SSD called an open channel SSD. The open channel SSD is an SSD the physical address of which may be directly accessed from an operating system (OS) or an application. When the open channel SSD is used, redundant address translation that has been performed in an SSD of the related art is avoided. In the SSD of the related art, processing such as garbage collection and wear leveling has been executed by a flash translation layer (FLT) included in the SSD. On the other hand, in the open channel SSD, such processing is executed on the OS side or the application side. In this case, the application executes the garbage collection using a slab as a unit.

In the memory cache system of the related art, the SSD executes the garbage collection independently of the application. Therefore, when the open channel SSD is used for the memory cache system of the related art, the garbage collection is executed at both the application level and the SSD level. In order to avoid redundant garbage collection, there is related art that causes one-to-one correspondence between a slab and a block of a Not AND (NAND) type flash memory. When the slab and the block are caused to correspond one to one, a result of the garbage collection using a block as a unit is the same as a result obtained from the garbage collection using a slab as a unit, and therefore, redundant garbage collection is limited to execute only one of the collections.

There is related art in which a key address generated in accordance with a key corresponding to a value and a physical address of the value are stored so as to be associated with each other, and a value is obtained by using a physical address corresponding to a key address of an input key. In addition, there is related art in which access to a physical packet is performed by using a packet conversion table in order to perform mapping to a physical packet position in association with an index key. Further, there is related art in which a chip number and a block number are stored at the end of garbage collection and the stored numbers are set as the starting position of the next garbage collection. Furthermore, there is related art in which a received file is divided into chunks and distributed in accordance with the maintenance hierarchy of a storage device.

Examples of the related art include Japanese Laid-open Patent Publication No. 2013-200839, Japanese Laid-open Patent Publication No. 2015-144022, Japanese Laid-open Patent Publication No. 2009-104430, and Japanese National Publication of International Patent Application No. 2016-541068.

SUMMARY

According to an aspect of the embodiments, a method for data management performed by a computer coupled to a solid state drive (SSD), the SSD being configured to include blocks and channels, each of the blocks being a first area as a unit of data deletion and being configured to include pages, each of the pages being a second area as a unit of data access in the SSD, each of the channels being a transmission and reception route of data to and from the block, the method includes: executing allocation processing that includes allocating, to a management target having a fixed length determined in advance, a logical block including the blocks coupled to different channels among the channels, executing management processing that includes, when a size of a division management target, which is generated by dividing the management target and is a unit of data access by software, is more than a size of the page, allocating the division management target to the pages coupled to the different channels from among the pages included in the logical block allocated to the management target by the allocation processing.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 illustrates an example of slab information;
FIG. 6 illustrates operation of get processing;
FIG. 8 illustrates a flowchart of processing at the time of reception of a get instruction;
FIG. 9 illustrates a flowchart of processing of garbage collection.

DESCRIPTION OF EMBODIMENTS

When a slave and a block are caused to correspond one to one, one channel through which reading and writing are performed is determined for the block. For this reason, it is difficult to cope with reading and writing of data in parallel by using two or more channels, and it is also difficult to improve the performance of reading and writing of the data.

In addition, in the related art in which a value is obtained by using a correspondence between a key address and a physical address of the value, a correspondence between a slab and a block is not taken into consideration, and therefore, it is difficult to improve the performance of reading and writing of data while avoiding redundant garbage collection. This is also applied to any of the related art in which a physical packet is accessed by a packet conversion table, the related art in which a chip number and a block number at the end of the garbage collection are set as the next starting position, and the related art in which a file is divided into chunks and distributed in accordance with the maintenance hierarchy.

The technology discussed herein is made in view of the above, and an object of the technology discussed herein is to provide an information processing apparatus, a data management program, and a data management method that improve the performance of reading and writing of data.

Embodiments of the information processing apparatus, the data management program, and the data management method according to the technology discussed herein are described in detail below with reference to the drawings. Note that the information processing apparatus, the data management program, and the data management method according to the present application are not limited to the following embodiments.

Embodiment 1

Figure 1:
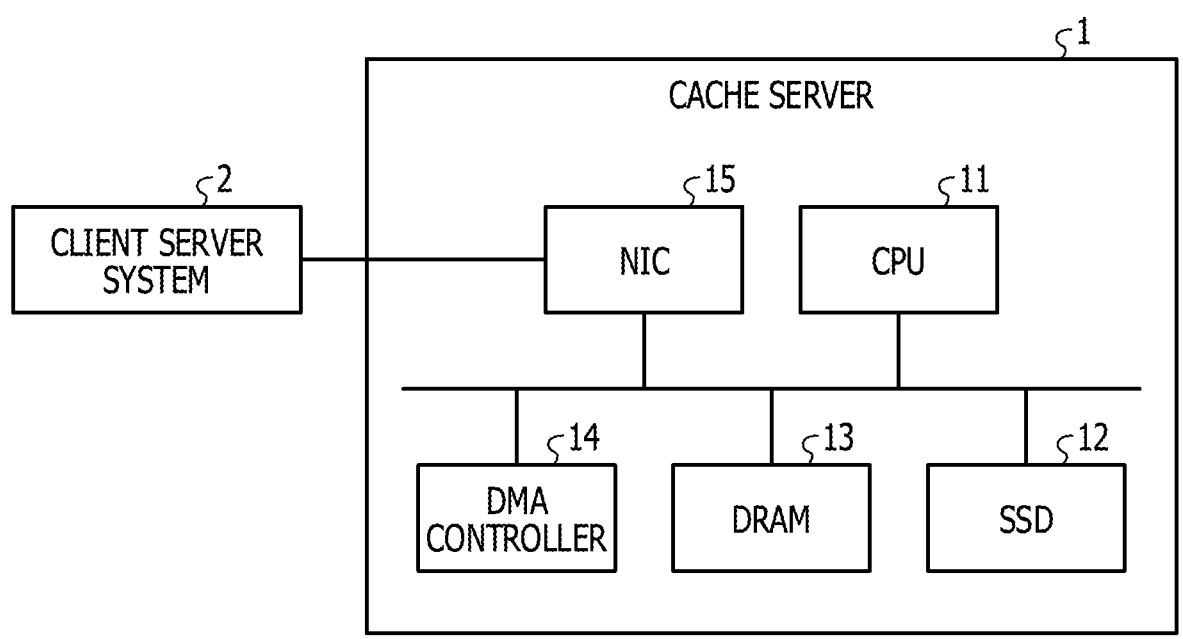
FIG. 1 illustrates a hardware configuration diagram of a cache server.

FIG. 1 illustrates a hardware configuration diagram of a cache server. As illustrated in FIG. 1, a cache server 1 that is an information processing apparatus includes a central processing unit (CPU) 11, a solid state drive (SSD) 12, a dynamic random access memory (DRAM) 13, a direct memory access (DMA) controller 14, and a network interface card (NIC) 15.

The NIC 15 is coupled to a client server system 2. The NIC 15 is an interface of data communication between the client server system 2 and the CPU 11 and/or the DRAM 13.

The SSD 12 is a storage device on which a NAND type flash memory is mounted. The SSD 12 is an open channel SSD. The SSD 12 has pages each of which is a unit area for writing and reading of data. In addition, the SSD 12 has blocks each of which is a unit for deletion of data and includes two or more pages. That is, the SSD 12 performs reading and writing of data by pages and deletion of data by blocks.

The SSD 12 has two or more channels through which reading and writing of data are performed. Different blocks are respectively coupled to the channels. In the SSD 12, reading and writing of data are performed in parallel by using two or more channels.

The SSD 12 stores data transmitted from the client server system 2. In addition, the SSD 12 stores various programs.

The CPU 11 is coupled to the SSD 12, the DRAM 13, and the DMA controller 14 through a bus. The CPU 11 realizes functions defined by various programs stored in the SSD 12 by deploying and executing the various programs on the DRAM 13. In addition, the CPU 11 sets data to the SSD 12 in response to a set processing request from the client server system 2. In addition, the CPU 11 reads data stored in the SSD 12 in response to a get processing request from the client server system 2.

The DMA controller 14 performs transmission and reception of data by using DMA transfer between the DRAM 13 and the client server system 2.

Figure 2:
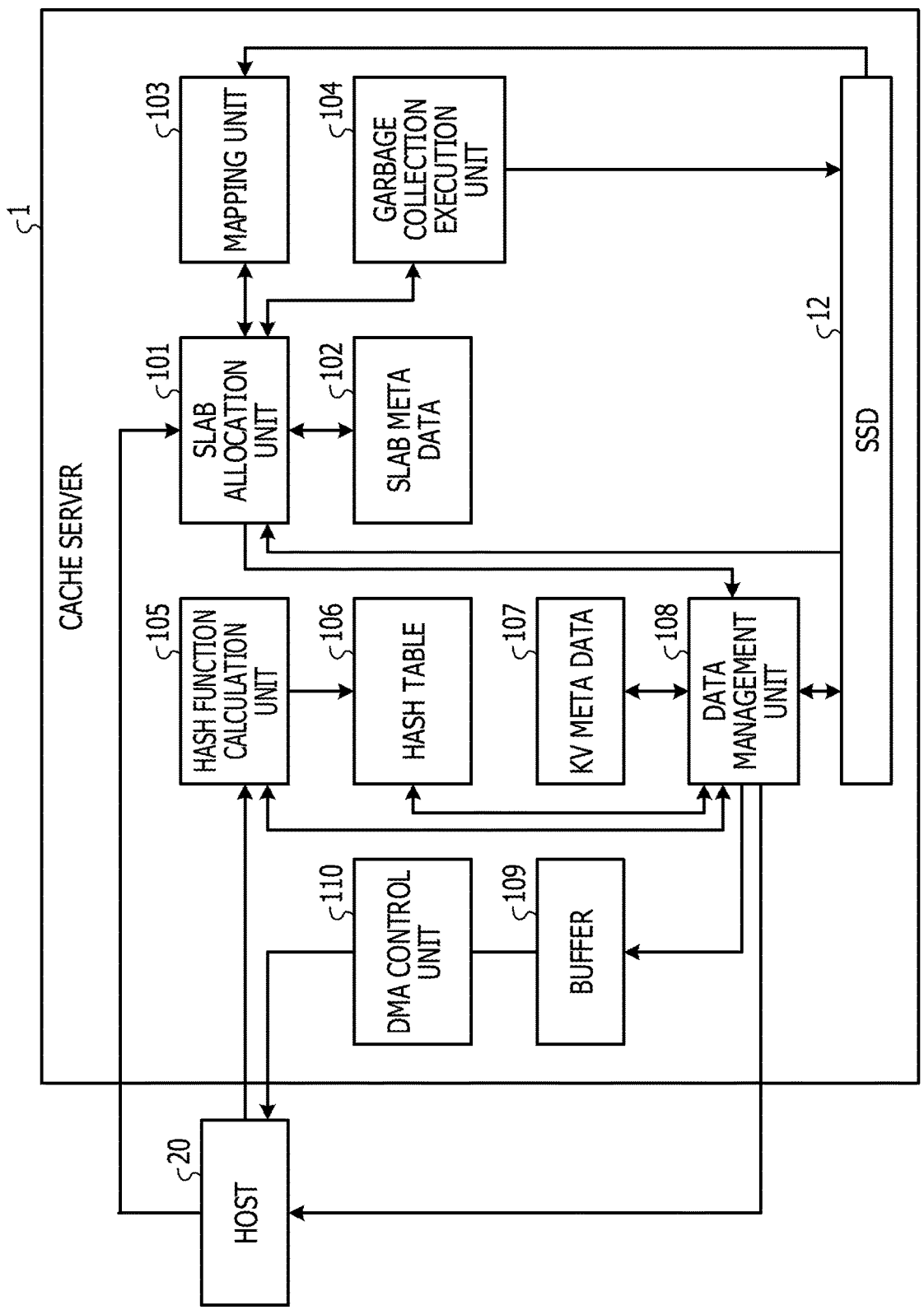
FIG. 2 illustrates a block diagram of the cache server.

FIG. 2 illustrates a block diagram of the cache server. The cache server 1 is coupled to a host 20 installed in the client server system 2 in FIG. 1. The host 20 is, for example, a client machine or a server machine.

The cache server 1 includes a slab allocation unit 101, slab meta data 102, a mapping unit 103, and a garbage collection execution unit 104. The cache server 1 further includes a hash function calculation unit 105, a hash table 106, key value (KV) meta data 107, a data management unit 108, a buffer 109, and a DMA control unit 110. In addition, as illustrated in FIG. 1, the cache server 1 includes the SSD 12.

The function of the slab allocation unit 101 is realized, for example, by the CPU 11 in FIG. 1. The slab allocation unit 101 receives a set instruction from the host 20. When the slab allocation unit 101 receives the set instruction, the slab allocation unit 101 obtains a single data size of key value-type data specified by the set instruction. The slab allocation unit 101 identifies, from the obtained data size, a size of a chunk that stores the key value-type data specified by the set instruction and a slab class including the chunk.

A concept which is used when an application that operates on the cache server 1 manages data by using the SSD 12 is described. A slab is a concept of a storage area for the application that operates on the cache server 1, which is used when the application manages data by using the SSD 12. The slab has a fixed size determined in advance. The slab is an example of "management target". The slab is divided into chunks each of which is a unit area that stores key value-type data. The chunk is also a concept of a storage area for the application, which is used when the application manages data by using the SSD 12. The chunk is an example of "division management target". There exist chunks having different sizes. Each of the chunks stores data having the chunk size or less and having a size larger than a chunk of a smaller size. Slabs are classified into groups each of which is called a slab class for each chunk size. A logical block of the SSD 12 is allocated to a slab, and thus, the slab that is the management target on the application corresponds to a block having a physical entity in the SSD 12.

Next, the slab allocation unit 101 determines whether a free area having a size corresponding to a slab exists in the SSD 12. When a free area having the size corresponding to the slab exists in the SSD 12, the slab allocation unit 101 instructs the mapping unit 103 to allocate a logical block to a new slab. After that, the slab allocation unit 101 receives, from the mapping unit 103, an input of information on the logical block allocated to the new slab.

The slab allocation unit 101 divides the slab to which the logical block has been allocated, into chunks such that the chunk matches a slab class of the key value-type data specified by the set instruction. Next, the slab allocation unit 101 allocates a page included in the logical block allocated to the slab, to each of the generated chunks. As a result, the slab allocation unit 101 may cause the chunk that is the management target on the application to correspond to a page having a physical entity in the SSD 12.

When the size of the chunk is larger than the size of the page, the slab allocation unit 101 selects pages one by one from blocks coupled to different channels and allocates the pages to the chunk. On the other hand, when the size of the chunk is the size of the page or less, the slab allocation unit 101 allocates a signal page included in a single block to the chunk. The slab allocation unit 101 sets the page allocated to the chunk as a storage destination of the key value-type data specified by the set instruction. In the following description, even when two or more pages are allocated to the chunk, a description is made by using an allocated page group as "page allocated to the chunk".

Subsequently, the slab allocation unit 101 stores, in the slab meta data 102, information on the slab class, identification information on the slab, information on the page allocated to each of the chunks included in the slab, and information indicating the usage of the each of the chunks.

The slab meta data 102 is stored, for example, in the DRAM 13 illustrated in FIG. 1. The slab meta data 102 is data storing the information on the slab and may include information other than the above-described information.

On the other hand, when a free area having the size corresponding to the slab does not exist in the SSD 12, the slab allocation unit 101 determines, in accordance with the slab meta data 102, whether a slab having a free chunk that may store data exists in the identified slab class.

When a slab having a free chunk exists in the slab class, the slab allocation unit 101 sets a page corresponding to the chunk as a storage destination of the key value-type data specified by the set instruction. After that, the slab allocation unit 101 registers information on the newly-used chunk in the slab meta data 102.

On the other hand, when a slab having a free chunk does not exist in the slab class, the slab allocation unit 101 instructs the garbage collection execution unit 104 to execute garbage collection. After that, the slab allocation unit 101 instructs the mapping unit 103 to allocate a new slab to a logical block in response to a garbage collection completion notification from the garbage collection execution unit 104. After that, the slab allocation unit 101 receives an input of information on the logical block that has been newly allocated to the slab from the mapping unit 103.

The slab allocation unit 101 divides, into chunks, the slab to which the logical block has been allocated such that the chunk match the slab class of the key value-type data specified by the set instruction. Next, the slab allocation unit 101 allocates a page included in the logical block allocated to the slab to each of the generated chunks. The slab allocation unit 101 sets the page allocated to the chunk as a storage destination of the key value-type data specified by the set instruction. After that, the slab allocation unit 101 stores newly-generated information on the slab in the slab meta data 102.

After the slab allocation unit 101 determines the storage destination of the key value-type data specified by the set instruction, the slab allocation unit 101 outputs the key value-type data specified by the set instruction and the information on the page that is the storage destination, to the data management unit 108. The slab allocation unit 101 is an example of "management unit".

The function of the mapping unit 103 is realized, for example, by the CPU 11 in FIG. 1. The mapping unit 103 receives an instruction of allocation of a logical block to a new slab from the slab allocation unit 101. The mapping unit 103 includes information on the usage of the SSD 12.

The mapping unit 103 selects blocks coupled to different channels one by one from among blocks that are not allocated to a slab in the SSD 12 to generate a logical block. In the embodiment, the mapping unit 103 generates a single logical block by using blocks respectively corresponding to all of the channels. For example, when one block is 2 MB, and the SSD 12 has 16 channels, the mapping unit 103 selects blocks one by one from the 16 channels to generate a logical block of 32 MB. The mapping unit 103 allocates a generated logical block to a slab to which the allocation instruction is received from the slab allocation unit 101.

In the embodiment, a single logical block is generated by selecting blocks from all of the channels one by one, however, it is only sufficient that the size of the logical block matches the size of the slab, and the method of generating a logical block is not limited to such an example. For example, when the size of the slab is smaller than a size in the case of using all of the channels, the mapping unit 103 may select some channels from among all of the channels and select blocks from the selected channels one by one to generate a single logical block. When the size of the slab is larger than a size in the case of using blocks from all of the channels one by one, the mapping unit 103 may select blocks from all of the channels one by one and then redundantly select a block from any channel to generate a single logical block.

Figure 3:
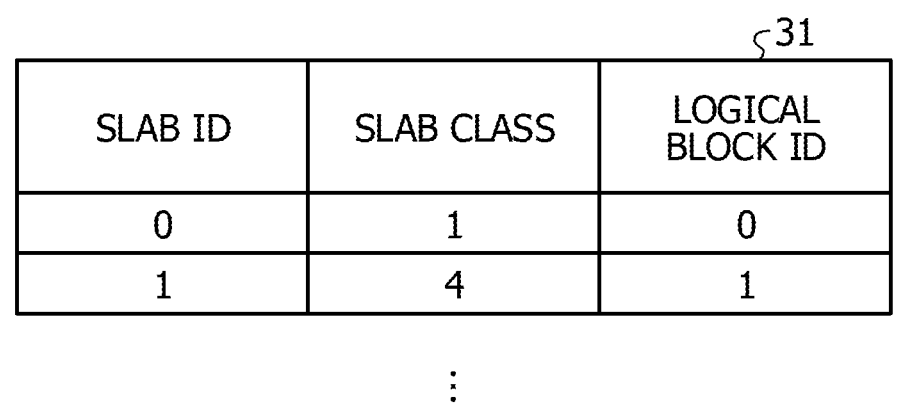

After that, the mapping unit 103 stores slab information 31 as illustrated in FIG. 3. FIG. 3 illustrates an example of the slab information. A slab ID in the slab information 31 is identification information on the slab notified by the slab allocation unit 101. The slab information 31 may be combined with the slab meta data 102 and stored. The mapping unit 103 notifies the slab allocation unit 101 of information on the logical block allocated to the slab. The mapping unit 103 is an example of "allocation unit".

The function of the garbage collection execution unit 104 is realized, for example, by the CPU 11 illustrated in FIG. 1. The garbage collection execution unit 104 receives a garbage collection execution instruction from the slab allocation unit 101. The garbage collection execution unit 104 executes the garbage collection for the SSD 12 to create an unused area. After that, the garbage collection execution unit 104 notifies the slab allocation unit 101 of completion of the garbage collection.

The function of the data management unit 108 is realized, for example, by the CPU 11 illustrated in FIG. 1. After a storage destination of the key value-type data specified by the set instruction is determined, the data management unit 108 receives from the slab allocation unit 101 inputs of the key value-type data specified by the set instruction and information on the page that is the storage destination. The data management unit 108 transmits a key specified by the set instruction to the hash function calculation unit 105. After that, the data management unit 108 obtains a hash value of the key specified by the set instruction from the hash function calculation unit 105.

Next, the data management unit 108 registers, in the KV meta data 107, the size of the key value-type data specified by the set instruction and the address of the page that is the storage destination of the data in the SSD 12. The KV meta data 107 is stored, for example, in the DRAM 13 illustrated in FIG. 1. The KV meta data 107 holds the physical address of the page allocated to the chunk that stores the key value-type data specified by the set instruction.

Next, the data management unit 108 registers, in the hash table 106, an entry having, as an output value, a value indicating the KV meta data 107 in which the obtained hash value is registered as an index.

In addition, the data management unit 108 determines whether a value corresponding to the same key exists in the SSD 12. When a value corresponding to the same key exists in the SSD 12, the data management unit 108 disables the old key value-type data corresponding to the same key in the SSD 12.

After that, the data management unit 108 stores the key value-type data specified by the set instruction in the page allocated to the chunk, which is the storage destination of the data in the SSD 12. After that, the data management unit 108 sends back a set completion response to the host 20.

When a get instruction is input from the host 20 to the cache server 1, the data management unit 108 obtains, from the hash table 106, an output value having, as an index, the hash value calculated from the key specified by the get instruction. Next, the data management unit 108 identifies the KV meta data 107 indicated by the obtained output value and obtains, from the identified KV meta data 107, the physical address of a page allocated to a chunk that stores key value-type data corresponding to the key. The data management unit 108 checks whether the key of the key value-type data stored in the page having the obtained physical address in the SSD 12 matches the key specified by the get instruction. Next, the data management unit 108 obtains a value of the key value-type data stored in the page having the obtained physical address in the SSD 12. After that, the data management unit 108 stores the obtained value in the buffer 109.

On the other hand, when there is no KV meta data 107 indicated by the output value from the hash table 106 having the hash value as the index, the data management unit 108 sends back a notification of failure to the host 20.

The function of the hash function calculation unit 105 is realized, for example, by the CPU 11 illustrated in FIG. 1. The hash function calculation unit 105 receives a get instruction from the host 20. The hash function calculation unit 105 calculates a hash value from a key specified by the get instruction. After that, the hash function calculation unit 105 inputs the calculated hash value to the hash table 106.

The hash table 106 is stored, for example, in the DRAM 13 illustrated in FIG. 1. The hash table 106 receives an input of the hash value from the hash function calculation unit 105. The hash table 106 outputs a value corresponding to the input hash value to the data management unit 108. For example, the hash table 106 outputs a pointer of the KV meta data 107 as the value corresponding to the hash value.

For example, the data management unit 108 may directly obtain, from the key, a storage position in the SSD 12 of the value corresponding to the key specified by the get instruction by using the hash function calculation unit 105, the hash table 106, and the KV meta data 107. The directly obtaining from the key is obtaining of the physical address without address conversion such as conversion from the logical address into the physical address on the SSD 12. The hash function calculation unit 105, the hash table 106, the KV meta data 107, and the data management unit 108 are examples of "reading unit".

The function of the DMA control unit 110 is realized, for example, by the DMA controller 14 illustrated in FIG. 1. The DMA control unit 110 transmits a value stored in the buffer 109 to the host 20 by DMA transfer. As a result, the host 20 obtains a value corresponding to the key specified by the get instruction as a response to the get instruction.

Figure 4:
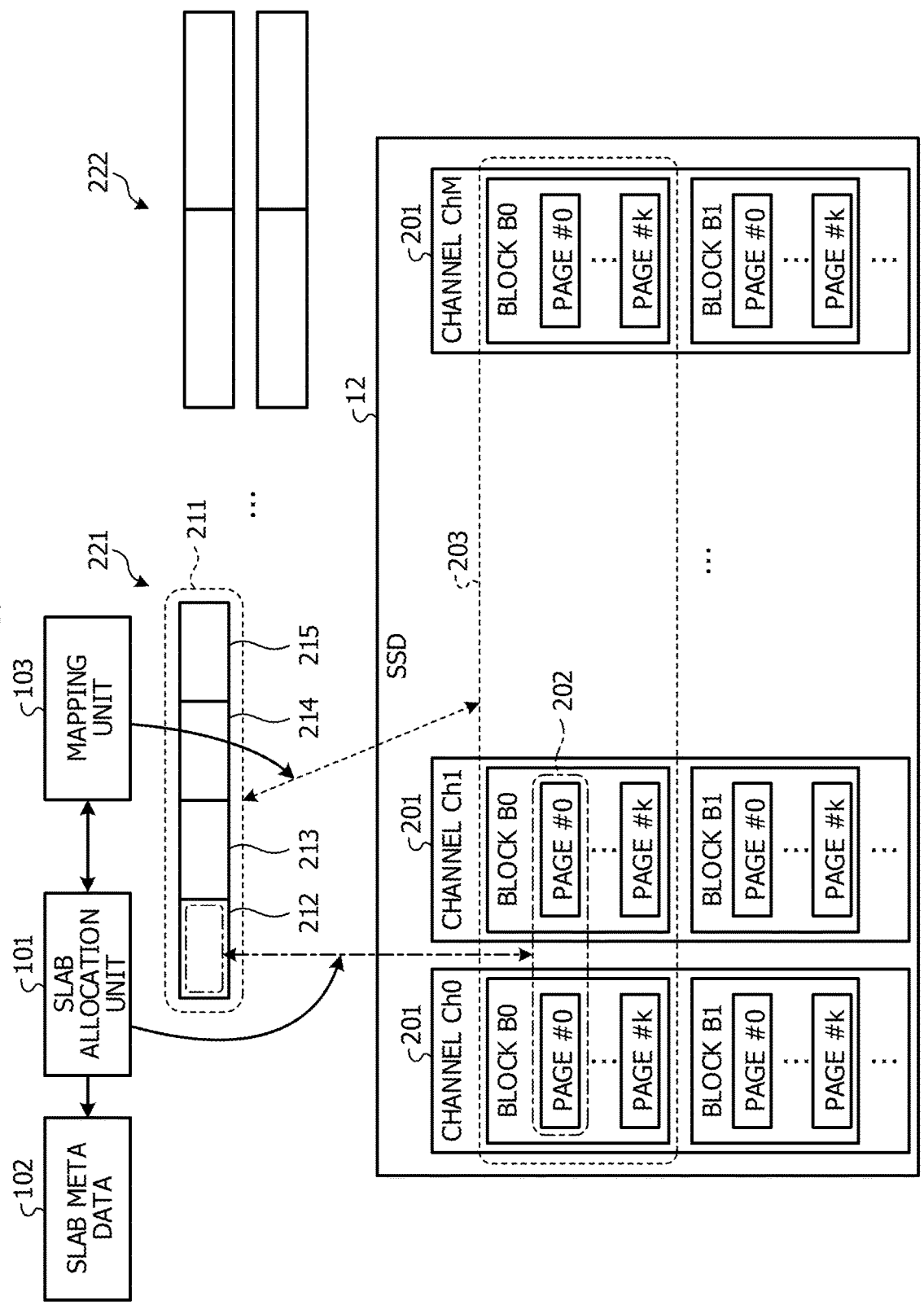
FIG. 4 illustrates allocation of pages when there is a free area in a solid state drive (SSD)

Allocation of a page to a chunk when there is a free area, in the SSD 12, having a size corresponding to a slab is described below with reference to FIG. 4. FIG. 4 illustrates allocation of a page when there is a free area in the SSD. Slab classes 221 and 222 in FIG. 4 indicates different slab classes. The SSD 12 has channels Ch0 to ChM as channels 201. Each of the channels Ch0 to ChM is coupled to two or more blocks including blocks B0 and B1.

The slab allocation unit 101 determines a slab class 221 as a storage destination for a key value-type data specified by a set instruction. When there is a free area having a size corresponding to a slab 211 included in the slab class 221 in the SSD 12, the slab allocation unit 101 instructs the mapping unit 103 to allocate a logical block to the slab 211.

The mapping unit 103 selects a block B0 from each of the channels Ch0 to ChM in response to the instruction from the slab allocation unit 101 and generates a single logical block 203. The mapping unit 103 allocates the logical block 203 to the slab 211 of the slab class 221. After that, the mapping unit 103 notifies the slab allocation unit 101 of the allocation of the logical block 203 to the slab 211.

When the slab allocation unit 101 receives the allocation notification of the logical block 203 to the slab 211 from the mapping unit 103, the slab allocation unit 101 divides the slab 211 into chunks 212 to 215 the sizes of which have been determined from the key value-type data specified by the set instruction. Next, the slab allocation unit 101 determines the chunk 212 to be a storage destination of the key value-type data specified by the set instruction. The slab allocation unit 101 calculates the number of pages which corresponds to the size of the chunk. A case in which a size having two pages corresponds to the size of the chunk 212 is described below.

The slab allocation unit 101 selects two channels Ch0 and Ch1 from among the channels Ch0 to ChM in the logical block 203 allocated to the slab 211. The slab allocation unit 101 selects a page #0 from each of the blocks B0 coupled to the selected channels Ch0 and Ch1 and sets the selected pages as a page 202. The slab allocation unit 101 allocates the page 202 to the chunk 212. After that, the slab allocation unit 101 registers, in the slab meta data 102, identification information on the slab 211, information on the chunks 212 to 215 of the slab 211, and information on the page 202 allocated to the chunk 212.

As a result, the chunk 212 corresponds to the page 202, and therefore, processing for the chunk 212 by the application becomes equal to processing for the page 202 in the SSD 12. For example, garbage collection executed by the application for the slab and the chunk being targets may be equal to the garbage collection executed in the SSD 12. For example, when the application moves data stored in a chunk to another slab, data stored in a page of a logical block is moved to a page of another logical block. Generating a slab that does not have a chunk storing valid data may be equal to generating a logical block that does not include valid page. In addition, when a slab that does not include valid data is deleted, each block included in a logical block that does not include valid page is also deleted. For example, when the garbage collection is executed on the application side, the garbage collection is also executed on the SSD 12 side.

Figure 5:
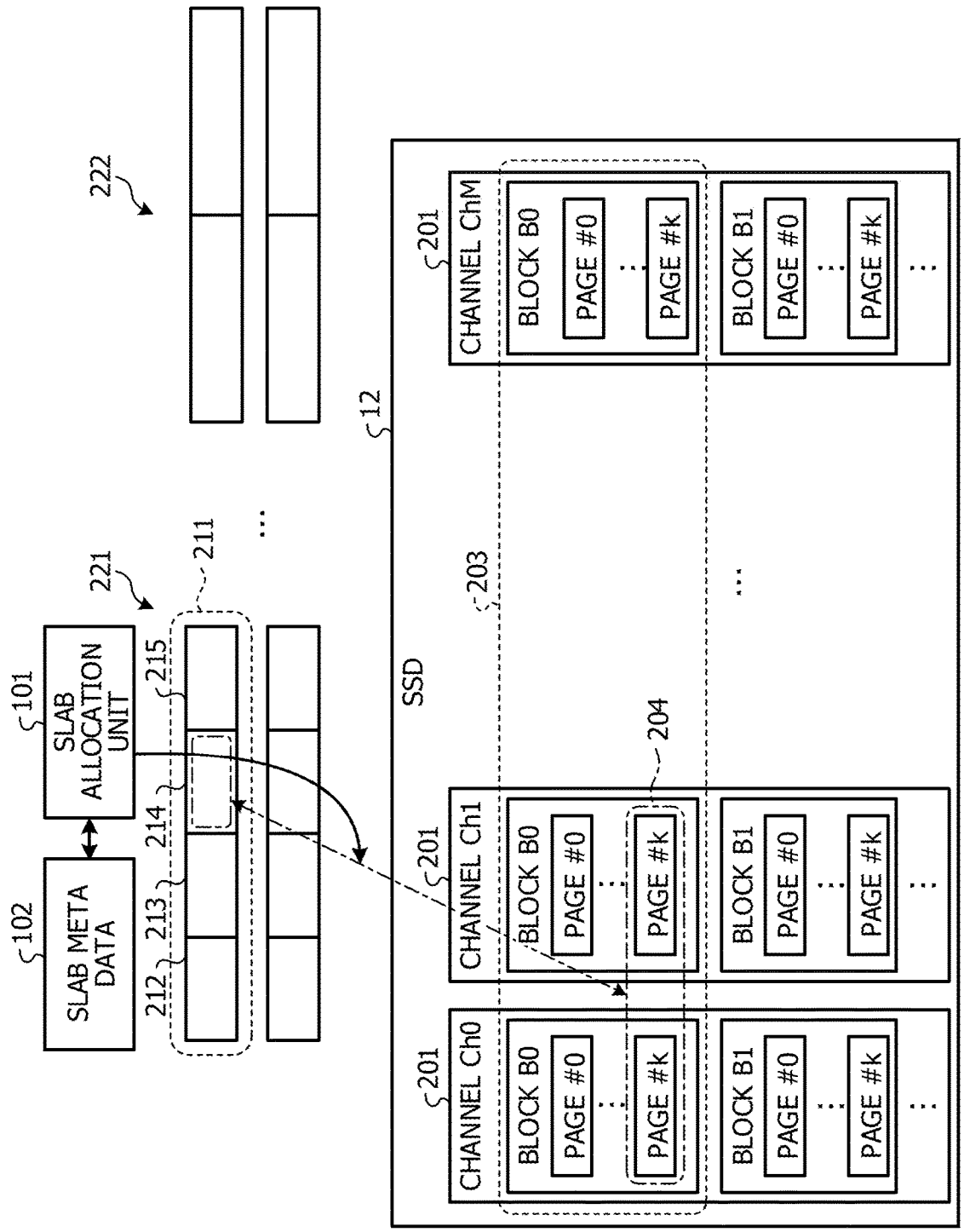
FIG. 5 illustrates allocation of pages when there is no free area in the SSD.

Allocation of a page to a chunk when there is no free area, in the SSD 12, having a size corresponding to a slab is described below with reference to FIG. 5. FIG. 5 illustrates allocation of a page when there is no free area in the SSD.

When there is no free area, in the SSD 12, having a size corresponding to a new slab, the slab allocation unit 101 determines, by using the slab meta data 102, whether there is a free chunk in a slab class 221 that stores a key value-type data specified by a set instruction. When a chunk 214 of the slab 211 of the slab class 221 is a free chunk, the slab allocation unit 101 selects two channels Ch0 and Ch1 from channels Ch0 to ChM of a logical block 203 allocated to the slab 211. The slab allocation unit 101 selects a page #k that is a free page from each of the blocks B0 coupled to the selected channels Ch0 and Ch1 and sets the selected pages as a page 204. The slab allocation unit 101 allocates the page 204 to the chunk 214. After that, the slab allocation unit 101 registers information on the page 204 allocated to the chunk 214 in the slab meta data 102.

In such a case, when there is no free chunk in the slab class 221 that stores the key value-type data specified by the set instruction, the slab allocation unit 101 creates in the SSD 12 a free area having a size corresponding to a slab by garbage collection. The slab allocation unit 101 performs operation similar to the allocation of a page to a chunk when there is a free area having a size corresponding to a slab in the SSD 12 illustrated in FIG. 4, for the free area that is a target in the SSD 12, which is created by the garbage collection.

Operation of each of the units in get processing is described below with reference to FIG. 6. FIG. 6 illustrates operation in the get processing.

The hash function calculation unit 105 obtains a key specified by a get instruction and calculates a hash value from the key. The hash function calculation unit 105 inputs the obtained hash value to the hash table 106. The hash table 106 outputs a value corresponding to the input hash value.

The data management unit 108 obtains an output value of the hash table 106. The data management unit 108 obtains the address of a storage destination of key value-type data specified by the get instruction from KV meta data 107 having the obtained output value as an index. In this case, the key value-type data specified by the get instruction is stored in the chunk 212. The page 202 is allocated to the chunk 212. Therefore, the data management unit 108 obtains the address of the page 202 from the KV meta data 107. Next, the data management unit 108 identifies the page 202 in the SSD 12 by using the obtained address and obtains a value from the page 202. The data management unit 108 transmits the obtained value to the transmission source of the get instruction to complete the get instruction.

Figure 7A:
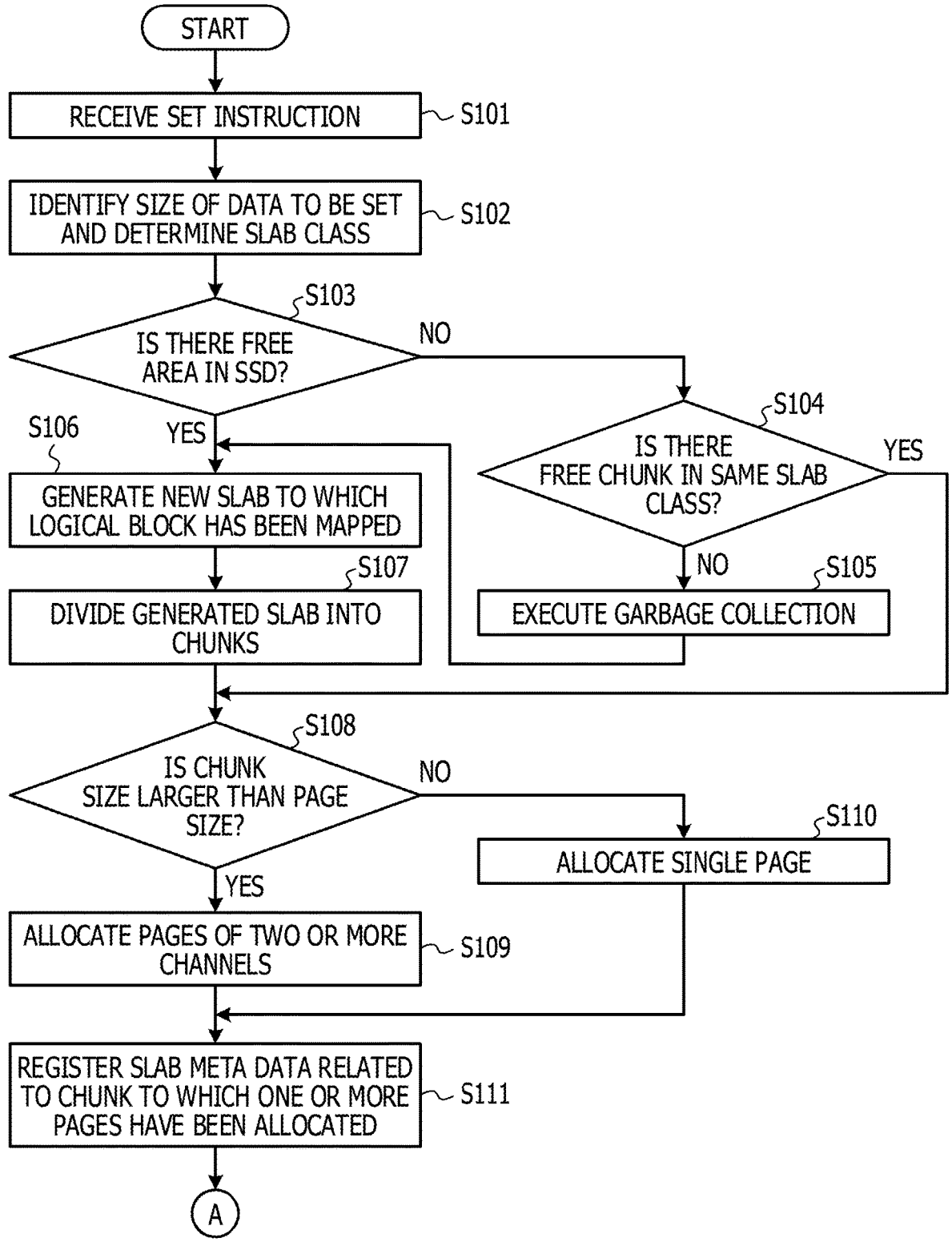
FIGS. 7A and 7B illustrate a flowchart of processing at the time of reception of a set instruction.
Figure 7B:
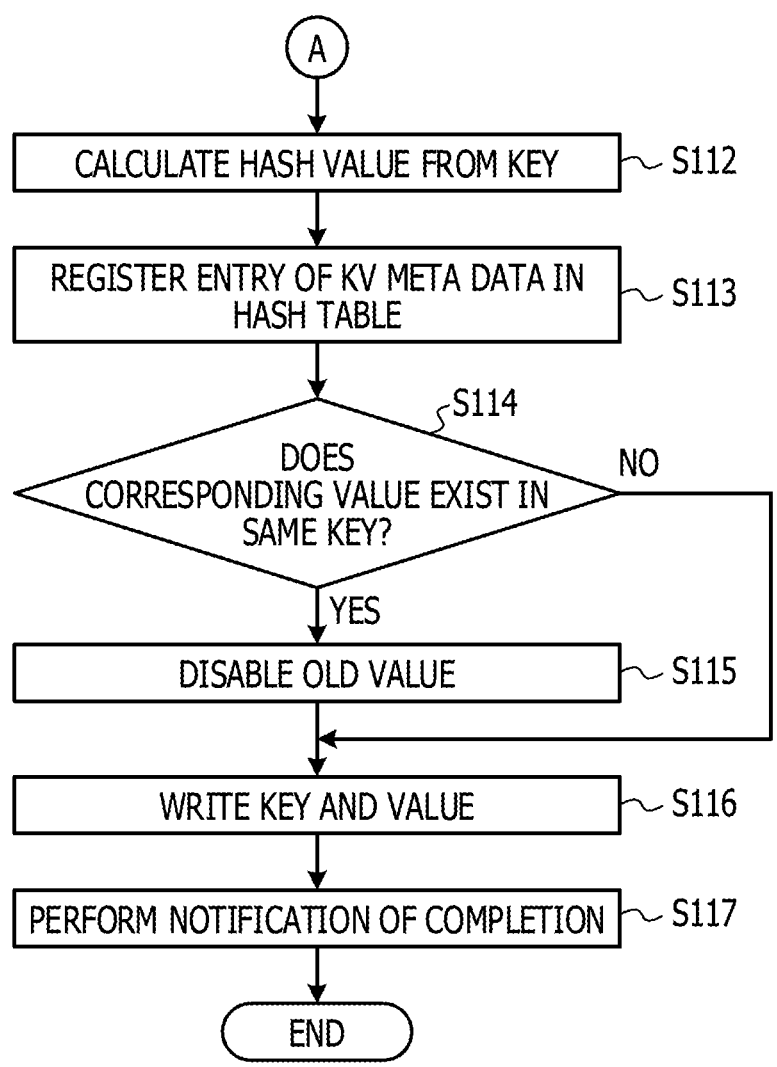

A flow of processing at the time of reception of a set instruction is described below with reference to FIGS. 7A and 7B. FIG. 7 (i.e., FIGS. 7A and 7B) illustrates a flowchart of the processing at the time of reception of a set instruction.

The slab allocation unit 101 receives a set instruction transmitted from the host 20 (Step S101).

Next, the slab allocation unit 101 identifies a size of key value-type data specified by the set instruction, which is to be set, and determines a slab class (Step S102).

Next, the slab allocation unit 101 determines whether a free area corresponding to a size of a slab exists in the SSD 12 (Step S103).

When a free area does not exist in the SSD 12 (Step S103: NO), the slab allocation unit 101 determines whether a free chunk exists in the same slab class (Step S104). When a free chunk exists in the same slab class (Step S104: YES), the slab allocation unit 101 sets the free chunk as a storage destination of the data specified by the set instruction, and the flow proceeds to Step S108.

On the other hand, when a free chunk does exist in the same slab class (Step S104: NO), the slab allocation unit 101 instructs the garbage collection execution unit 104 to execute garbage collection. The garbage collection execution unit 104 executes the garbage collection in response to the instruction from the slab allocation unit 101 and generates a free area corresponding to the size of the slab in the SSD 12 (Step S105). After that, when the slab allocation unit 101 receives a completion notification of the garbage collection from the garbage collection execution unit 104, the flow proceeds to Step S106.

When a free area exists in the SSD 12 (Step S103: YES), the slab allocation unit 101 requests the mapping unit 103 to allocate a logical block to a new slab. The mapping unit 103 allocates the logical block to the new slab in response to the request from the slab allocation unit 101. The mapping unit 103 outputs, to the slab allocation unit 101, information on the logical block allocated to the slab. The slab allocation unit 101 receives the information on the allocated logical block from the mapping unit 103. As a result, the slab allocation unit 101 generates the new slab to which the logical block has been mapped (Step S106).

Next, the slab allocation unit 101 divides the generated slab into chunks the sizes of which correspond to the data specified by the set instruction (Step S107). The slab allocation unit 101 selects a storage destination of the data specified by the set instruction from among the generated chunks.

Next, the slab allocation unit 101 determines whether the chunk size is larger than a page size (Step S108). When the chunk size is larger than the page size (Step S108: YES), the slab allocation unit 101 selects pages coupled to different channels one by one for a slab size from among pages included in the logical block notified by the mapping unit 103. The slab allocation unit 101 allocates the selected pages to the chunk that is the storage destination of the data specified by the set instruction (Step S109).

On the other hand, when the chunk size is the page size or less (Step S108: NO), the slab allocation unit 101 allocates a single page to the chunk that is the storage destination of the data specified by the set instruction (Step S110).

The slab allocation unit 101 registers slab meta data 102 related to the chunk to which the one or more pages have been allocated (Step S111). After that, the slab allocation unit 101 outputs, to the data management unit 108, the key value-type data specified by the set instruction, information on the chunk that stores the data, and information on the one or more pages that have been allocated to the chunk.

The data management unit 108 receives, from the slab allocation unit 101, inputs of the key value-type data specified by the set instruction, the information on the chunk that stores the data, and the information on the one or more pages that have been allocated to the chunk. The data management unit 108 outputs the key to the hash function calculation unit 105. The hash function calculation unit 105 calculates a hash value from the key input from the data management unit 108 (Step S112).

The data management unit 108 obtains the hash value calculated by the hash function calculation unit 105. Next, the data management unit 108 registers, in the KV meta data 107, the size of the key value-type data specified by the set instruction and the address of the page of the SSD 12, which stores the data. After that, the data management unit 108 registers, in the hash table 106, an entry in which an output value is a value indicating the KV meta data 107 in which the address of the page has been registered, by using the obtained hash value as an index (Step S113).

Next, the data management unit 108 determines whether a value corresponding to the same key exists in the SSD 12 (Step S114). When a value corresponding to the same key does not exist in the SSD 12 (Step S114: NO), in the data management unit 108, the flow proceeds to Step S116.

On the other hand, when a value corresponding to the same key exists in the SSD 12 (Step S114: YES), the data management unit 108 disables the old key value-type data corresponding to the same key in the SSD 12 (Step S115).

Next, the data management unit 108 writes the key and the value into the page of the SSD 12, which has been allocated to the chunk that is the storage destination of the key value-type data (step S116).

After that, the data management unit 108 notifies the host 20 of completion of the setting (step S117).

A flow of processing at the reception of a get instruction is described below with reference to FIG. 8. FIG. 8 illustrates a flowchart of the processing at the time of reception of a get instruction.

The hash function calculation unit 105 receives a get instruction from the host 20 (Step S201).

Next, the hash function calculation unit 105 calculates a hash value from a key specified by the get instruction (Step S202). The hash function calculation unit 105 outputs the calculated hash value to the data management unit 108.

Next, the data management unit 108 obtains an output value corresponding to the hash value calculated by the hash function calculation unit 105 with reference to the hash table 106 (Step S203).

Next, the data management unit 108 determines whether KV meta data 107 indicated by the output value from the hash table 106 exists (Step S204).

When the KV meta data 107 indicated by the output value exists (Step S204: YES), the data management unit 108 obtains the KV meta data 107 identified in accordance with the output value of the hash table 106 (Step S205).

Next, the data management unit 108 obtains the physical address in the SSD 12, which is held by the obtained the KV meta data 107 (Step S206).

Next, the data management unit 108 obtains a value from a page indicated by the obtained physical address in the SSD 12 (Step S207).

After that, the data management unit 108 stores the obtained value in the buffer 109. The DMA control unit 110 sends back the value stored in the buffer 109 as a value of a response to the get instruction to the host 20 by DMA transfer (Step S208).

On the other hand, when KV meta data 107 indicated by the output value does not exist (Step S204: NO), the data management unit 108 sends back a notification of failure as a response to the get instruction to the host 20 (Step S209).

A flow of processing of garbage collection in the cache server 1 according to the embodiment is described below with reference to FIG. 9. FIG. 9 illustrates a flowchart of the processing of the garbage collection.

The garbage collection execution unit 104 receives information on a specific slab class that stores data specified by a set instruction with a garbage collection execution instruction from the slab allocation unit 101. The garbage collection execution unit 104 detects, from the specific slab class, a slab having the smallest amount of valid key value-type data in the specific slab class as a movement source slab (Step S301).

Next, the garbage collection execution unit 104 detects a slab having a free area as a movement destination slab from the same slab class as the movement source slab, that is, the specific slab class (Step S302).

Next, the garbage collection execution unit 104 selects one piece of valid key value-type data of the movement source slab (Step S303).

Next, the garbage collection execution unit 104 copies the selected key value-type data to the free chunk of the movement destination slab and disables the chunk that has previously stored the selected data of the movement source slab (Step S304). In such processing, in the SSD 12, data of a page that stores the selected data in a logical block corresponding to the movement source slab is copied to a free page in a logical block corresponding to the movement destination slab. The page that has previously stored the copied data is disabled.

The garbage collection execution unit 104 determines whether all chunks of the movement source slab have been disabled (Step S305). When a chunk that stores valid key value-type data still exists (Step S305: NO), in the garbage collection execution unit 104, the flow returns to Step S303.

On the other hand, when all of the chunks of the movement source slab have been disabled (Step S305: YES), the garbage collection execution unit 104 causes the movement source slab to be empty and deletes all of the blocks included in the corresponding logical block (Step S306).

As described above, when the garbage collection is executed by the application, the cache server according to the embodiment obtains a result similar to that of the garbage collection on the hardware side, which is executed by the SSD. Thus, the cache server according to the embodiment may not execute the garbage collection on the hardware side, which is executed by the SSD. In addition, the cache server according to the embodiment allocates two or more pages coupled to different channels to a single chunk and performs writing into the two or more pages in parallel by using the two or more channels at the time of writing of data into the chunk. As a result, the performance of reading and writing of data are improved.

Embodiment 2

Embodiment 2 is described below. A cache server according to Embodiment 2 is different from Embodiment 1 in that garbage collection is periodically executed even in the background independently of creation of a slab. FIGS. 1 and 2 also illustrate the cache server according to Embodiment 2. In the following description, operation of units similar to those of Embodiment 1 is omitted.

The garbage collection execution unit 104 includes a timer. In addition, the garbage collection execution unit 104 stores, in advance, a specific time period that is an execution cycle of the garbage collection in the background. The garbage collection execution unit 104 measures a time period by using the timer and starts the garbage collection for each slab class each time the specific time period elapses.

The garbage collection execution unit 104 selects a single slab class from among slab classes. The garbage collection execution unit 104 checks the number of free chunks of the selected slab class. When the number of free chunks of the selected slab class is a threshold or less, which has been determined in advance, the garbage collection execution unit 104 executes the garbage collection for the selected slab class. The garbage collection execution unit 104 repeatedly executes processing of the above-described determination and garbage collection for all of the slab classes.

Similarly to Embodiment 1, the garbage collection execution unit 104 may execute the garbage collection in addition to the garbage collection in the background even when there is no free area in a case in which the slab allocation unit 101 performs allocation of a slab.

Figure 10:
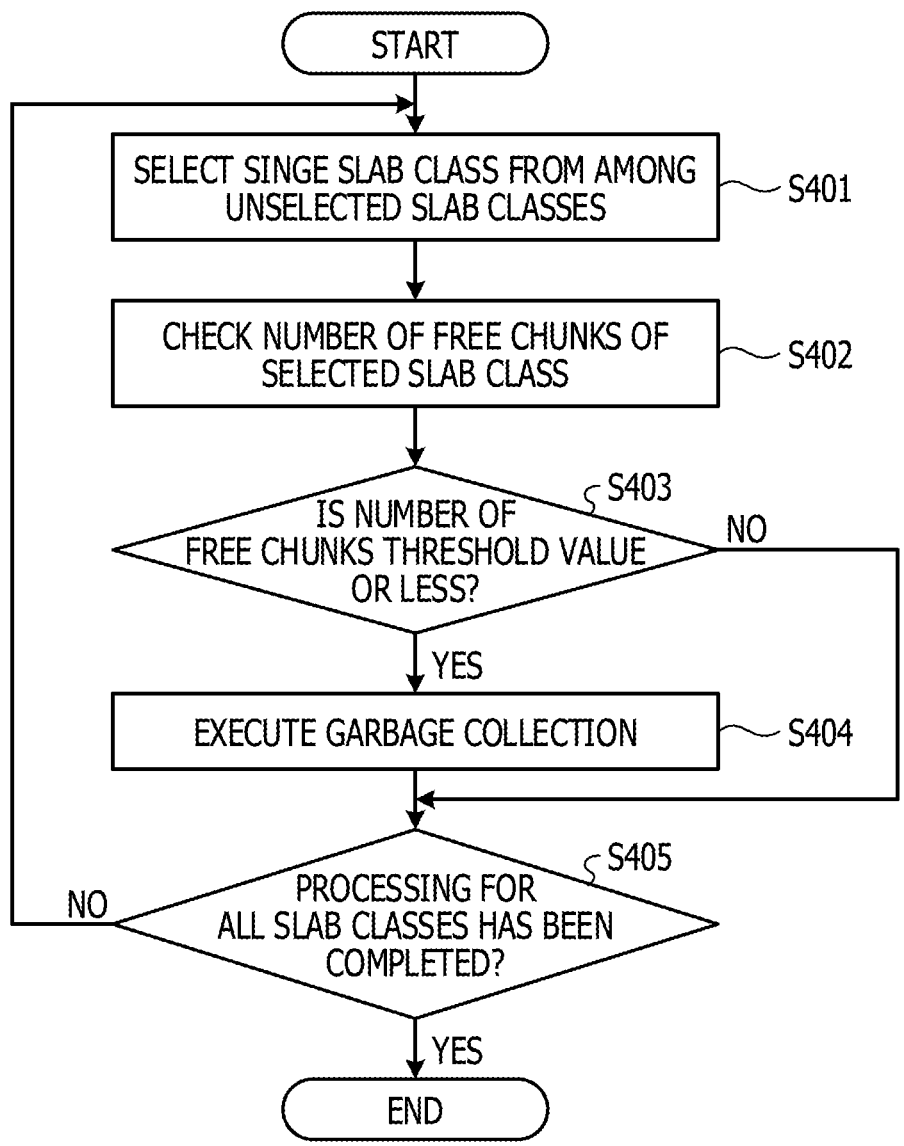
FIG. 10 illustrates a flowchart of processing of garbage collection in the background.

The flow of the processing of the garbage collection in the background is described below with reference to FIG. 10 again. FIG. 10 illustrates a flowchart of the processing of garbage collection in the background.

The garbage collection execution unit 401 selects a single slab class from among unselected slab classes (Step S401).

Next, the garbage collection execution unit 401 checks the number of free chunks of the selected slab class (Step S402).

Next, the garbage collection execution unit 104 determines whether the number of free chunks of the selected slab class is a threshold value or less (Step S403). When the number of free chunks is more than the threshold value (Step S403: NO), in the garbage collection execution unit 104, the flow proceeds to Step S405.

On the other hand, when the number of free chunks is the threshold value or less (Step S403: YES), the garbage collection execution unit 104 executes the garbage collection for the selected slab class (Step S404).

After that, the garbage collection execution unit 104 determines whether the processing has been completed for all of the slab classes (Step S405). When there still exists a slab class for which the processing is yet to be completed (Step S405: NO), in the garbage collection execution unit 104, the flow returns to Step S401.

On the other hand, when the processing has been completed for all of the slab classes (Step S405: YES), the garbage collection execution unit 104 ends the garbage collection in the background. The garbage collection execution unit 104 repeats Steps S401 to 405 at specific intervals.

As described above, the cache server according to Embodiment 2 executes the garbage collection in the background at the specific intervals. As a result, the SSD 12 is likely to have a free area at the time of reception of a set instruction, and execution of the garbage collection during processing of the set instruction is avoided, and the write speed of data is further improved.

Embodiment 3

Figure 11:
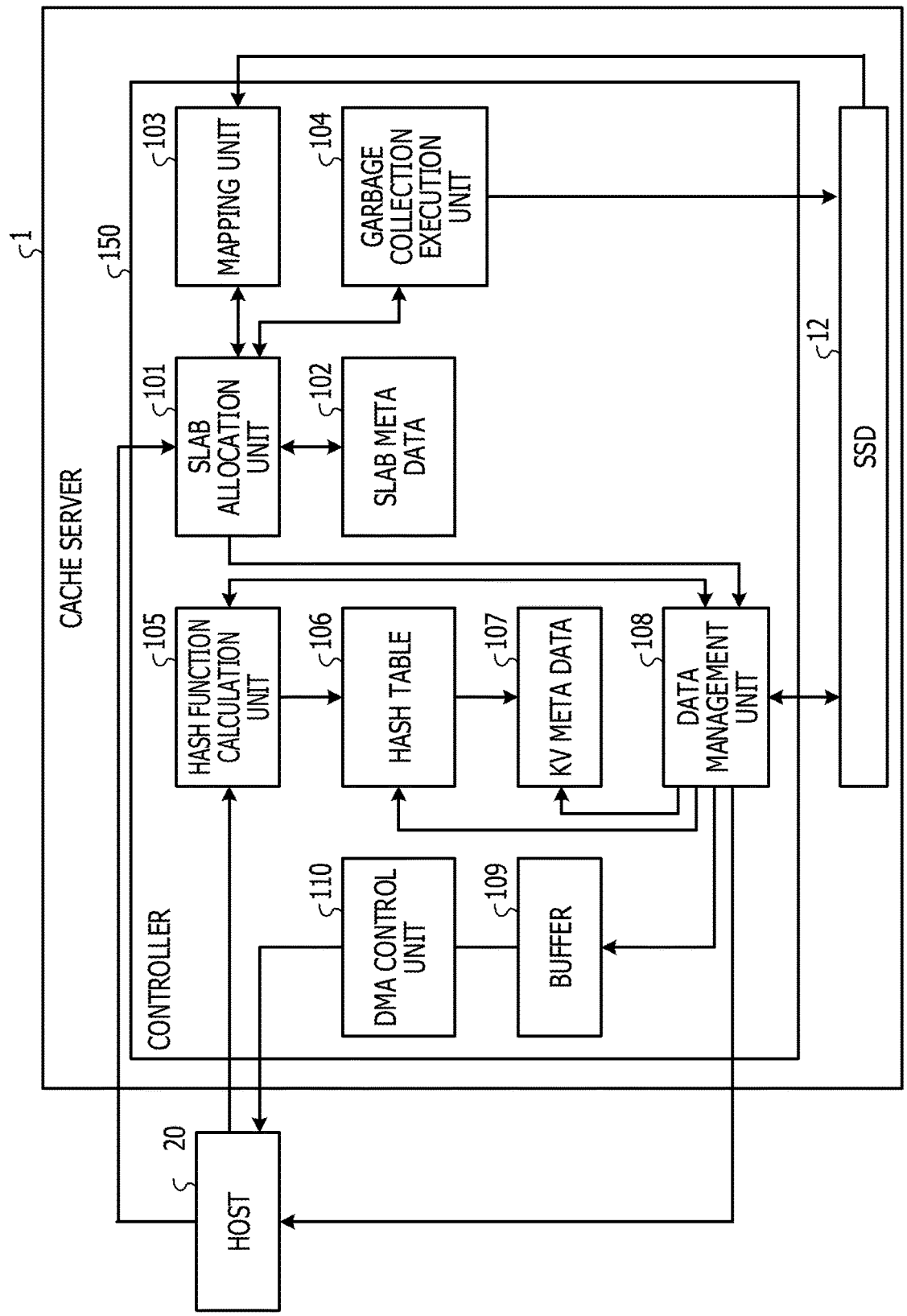
FIG. 11 illustrates a block diagram of a cache server according to Embodiment 3.

FIG. 11 illustrates a block diagram of a cache server according to Embodiment 3. The cache server 1 according to Embodiment 3 is different from Embodiment 1 in that processing such as allocation of a logical block to a slab, creation of a chunk that stores data, and allocation of a page is executed by hardware. Units of the cache server 1 according to Embodiment 3 include functions similar to those of Embodiment 1.

The cache server 1 according to Embodiment 3 includes a controller 150. The controller 150 is constituted by a field programmable gate array (FPGA) or a large scale integration (LSI). The controller 150 includes a circuit that realizes each of the functions of the slab allocation unit 101, the mapping unit 103, the garbage collection execution unit 104, the hash function calculation unit 105, the data management unit 108, and the DMA control unit 110. The controller 150 includes a DRAM that stores the slab meta data 102, the hash table 106, the KV meta data 107, and the buffer 109. The controller 150 communicates with the SSD 12 through two or more channels.

As described above, the cache server according to Embodiment 3 realizes functions such as allocation of a logical block to a slab, creation of a chunk that stores data, and allocation of a page by hardware. As a result, the reading and writing of data may be performed faster than a case in which such functions are realized by software.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An apparatus for data management, comprising:
   an open-channel solid state drive (SSD) configured to include a plurality of channels, each of the plurality of channels including a plurality of blocks, each of the plurality of blocks included in each of the plurality of channels being a first area as a unit of data deletion and being configured to include a plurality of pages, each of the plurality of pages being a second area as a unit of data access in the open-channel SSD, each of the plurality of channels being a transmission and reception route of data to and from each of the plurality of blocks included in that channel, each of the plurality of blocks included in each of the plurality of channels being associated with that channel; and
   a processor coupled to the open-channel SSD, the processor being configured to:
   execute allocation processing that includes
   obtaining blocks from the plurality of channels by selecting, for each of the plurality of channels, a block from among the plurality of blocks included in that channel, each of the obtained blocks being associated with any one of the plurality of channels wherein that channel is different from each channel associated with other blocks of the obtained blocks,
   generating a logical block by using the obtained blocks each of which has been selected from a respective channel of the plurality of channels, the generated logical block including the obtained blocks configured to be accessed parallel from the apparatus via each of the plurality of channels, and allocating the generated logical block to a slub that is a management target having a fixed length determined in advance; and execute management processing that includes, in response that a size of a chunk being a unit of data access by software and being generated by dividing the slub is more than a size of one of the plurality of pages, obtaining pages from the blocks included in the logical block corresponding to the slub by selecting, for each block of at least a part of the plurality of blocks included in that logical block, a page from among the plurality of pages included in that block, each of the obtained pages being associated with any one of the plurality of channels wherein that channel is different from each channel associated with other pages of the obtained pages, and allocating the obtained pages to the chunk, the obtained pages allocated to the chunk being configured to be accessed parallel from the apparatus via each of the plurality of channels.

2. The apparatus according to claim 1, wherein the management processing is configured to allocate the division management target to one of the pages included in the logical block allocated to the management target when the size of the division management target is less than the size of one of the plurality of pages.

3. The apparatus according to claim 1, wherein the processor is further configured to execute deletion control processing that includes deleting data of the blocks included in the logical block in the open-channel SSD by executing data deletion processing of moving valid data in a specific management target to another management target and deleting all data in the specific management target without the valid data existing in the specific management target.

4. The apparatus according to claim 3, wherein the deletion control processing is configured to execute the data deletion processing at specific intervals.

5. The apparatus according to claim 1, wherein the processor is further configured to execute execution processing that includes, when processing for the division management target is requested by the software, executing processing for the pages allocated to the division management target by the management processing.

6. The apparatus according to claim 1, wherein the open-channel SSD is configured to store second information corresponding to first information, and wherein the processor is further configured to execute read processing that includes holding correspondence information between a storage location of the second information and the first information, obtaining, based on the correspondence information, a storage position of the second information in the open-channel SSD in response to a request, from the software, of reading the second information using the first information, and reading the second information from the obtained storage position.

7. A method of data management performed by a computer coupled to an open-channel solid state drive (SSD), the SSD being configured to include a plurality of channels, each of the plurality of channels including a plurality of blocks, each of the plurality of blocks included in each of the plurality of channels being a first area as a unit of data deletion and being configured to include a plurality of pages, each of the plurality of pages being a second area as a unit of data access in the open-channel SSD, each of the plurality of channels being a transmission and reception route of data to and from each of the plurality of blocks included in that channel, each of the plurality of blocks included in each of the plurality of channels being associated with that channel;

the method comprising:

executing allocation processing that includes obtaining blocks from the plurality of channels by selecting, for each of the plurality of channels, a block from among the plurality of blocks included in that channel, each of the obtained blocks being associated with any one of the plurality of channels wherein that channel is different from each channel associated with other blocks of the obtained blocks, generating a logical block by using the obtained blocks each of which has been selected from a respective channel of the plurality of channels, the generated logical block including the obtained blocks configured to be accessed parallel from the apparatus via each of the plurality of channels, and allocating the generated logical block to a slub that is a management target having a fixed length determined in advance; and executing management processing that includes, in response that a size of a chunk being a unit of data access by software and being generated by dividing the slub is more than a size of one of the plurality of pages, obtaining pages from the blocks included in the logical block corresponding to the slub by selecting, for each block of at least a part of the plurality of blocks included in that logical block, a page from among the plurality of pages included in that block, each of the obtained pages being associated with any one of the plurality of channels wherein that channel is different from each channel associated with other pages of the obtained pages, and allocating the obtained pages to the chunk, the obtained pages allocated to the chunk being configured to be accessed parallel from the apparatus via each of the plurality of channels.

8. The method according to claim 7, wherein the management processing is configured to allocate the division management target to one of the pages included in the logical block allocated to the management target when the size of the division management target is less than the size of one of the plurality of pages.

9. The method according to claim 7, the method further comprising executing deletion control processing that includes deleting data of the blocks included in the logical block in the open-channel SSD by executing data deletion processing of moving valid data in a specific management target to another management target and deleting all data in the specific management target without the valid data existing in the specific management target.

10. The method according to claim 9, wherein the deletion control processing is configured to execute the data deletion processing at specific intervals.

11. The method according to claim 7, the method further comprising:

executing execution processing that includes, when processing for the division management target is requested by the software, executing processing for the pages allocated to the division management target by the management processing.

12. The method according to claim 7, wherein
the open-channel SSD is configured to store second information corresponding to first information, and wherein
the method further comprises:
executing read processing that includes
holding correspondence information between a storage location of the second information and the first information,
obtaining, based on the correspondence information, a storage position of the second information in the open-channel SSD in response to a request, from the software, of reading the second information using the first information, and
reading the second information from the obtained storage position.

13. A non-transitory computer-readable storage medium for storing a program which causes a processor to perform processing for data management, the processor being coupled to an open-channel solid state drive (SSD), the SSD being configured to include a plurality of channels, each of the plurality of channels including a plurality of blocks, each of the plurality of blocks included in each of the plurality of channels being a first area as a unit of data deletion and being configured to include a plurality of pages, each of the plurality of pages being a second area as a unit of data access in the open-channel SSD, each of the plurality of channels being a transmission and reception route of data to and from each of the plurality of blocks included in that channel, each of the plurality of blocks included in each of the plurality of channels being associated with that channel; the processing comprising:
executing allocation processing that includes
obtaining blocks from the plurality of channels by selecting, for each of the plurality of channels, a block from among the plurality of blocks included in that channel, each of the obtained blocks being associated with any one of the plurality of channels wherein that channel is different from each channel associated with other blocks of the obtained blocks,
generating a logical block by using the obtained blocks each of which has been selected from a respective channel of the plurality of channels, the generated logical block including the obtained blocks configured to be accessed parallel from the apparatus via each of the plurality of channels, and
allocating the generated logical block to a slub that is a management target having a fixed length determined in advance; and
executing management processing that includes,
in response that a size of a chunk being a unit of data access by software and being generated by dividing the slub is more than a size of one of the plurality of pages,
obtaining pages from the blocks included in the logical block corresponding to the slub by selecting, for each block of at least a part of the plurality of blocks included in that logical block, a page from among the plurality of pages included in that block, each of the obtained pages being associated with any one of the plurality of channels wherein that channel is different from each channel associated with other pages of the obtained pages, and
allocating the obtained pages to the chunk, the obtained pages allocated to the chunk being configured to be accessed parallel from the apparatus via each of the plurality of channels.

14. The non-transitory computer-readable storage medium according to claim 13, wherein the management processing is configured to allocate the division management target to one of the pages included in the logical block allocated to the management target when the size of the division management target is less than the size of one of the plurality of pages.

15. The non-transitory computer-readable storage medium according to claim 13, the method further comprising:
executing deletion control processing that includes deleting data of the blocks included in the logical block in the open-channel SSD by executing data deletion processing of moving valid data in a specific management target to another management target and deleting all data in the specific management target without the valid data existing in the specific management target.

16. The non-transitory computer-readable storage medium according to claim 15, wherein the deletion control processing is configured to execute the data deletion processing at specific intervals.

17. The non-transitory computer-readable storage medium according to claim 13, the method further comprising:
executing execution processing that includes, when processing for the division management target is requested by the software, executing processing for the pages allocated to the division management target by the management processing.

18. The non-transitory computer-readable storage medium according to claim 13, wherein
the open-channel SSD is configured to store second information corresponding to first information, and wherein
the method further comprises:
executing read processing that includes
holding correspondence information between a storage location of the second information and the first information,
obtaining, based on the correspondence information, a storage position of the second information in the open-channel SSD in response to a request, from the software, of reading the second information using the first information, and
reading the second information from the obtained storage position.

* * * * *